Figure 1:
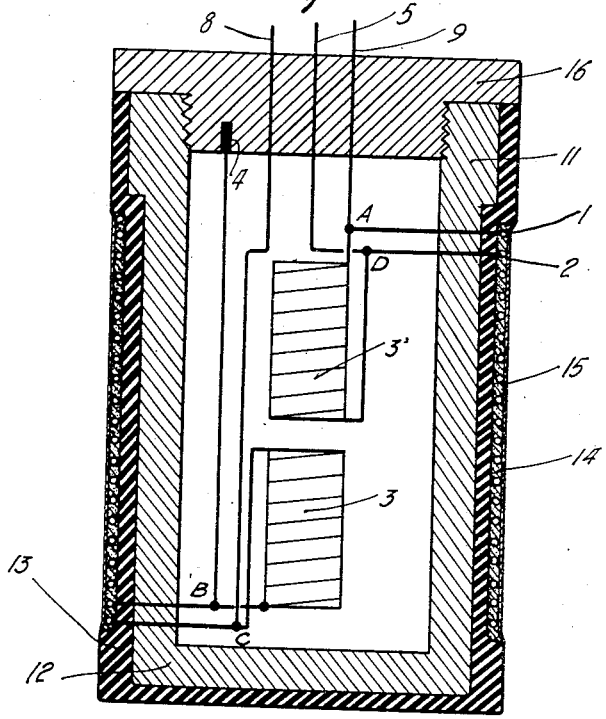

April 8, 1941.   H. G. DOLL   2,238,015
RESISTANCE THERMOMETER AND METHOD OF MANUFACTURING THE SAME
Filed Dec. 27, 1937   2 Sheets-Sheet 1

Inventor:-
Henri Georges Doll
By Mauro + Lewis
Attorneys

Patented Apr. 8, 1941

2,238,015

UNITED STATES PATENT OFFICE 2,238,015

RESISTANCE THERMOMETER AND METHOD OF MANUFACTURING THE SAME

Henri Georges Doll, Paris, France, assignor, by mesne assignments, to Schlumberger Well Surveying Corporation, Houston, Tex., a corporation of Delaware Application December 27, 1937, Serial No. 181,880
In France January 18, 1937

6 Claims. (Cl. 73—362)

The present invention relates to thermometers which utilize for making temperature measurements the changes in resistance due to varying temperature of certain substances, particularly metallic alloys such as certain ferro-nickels (fix-ampere). It relates more particularly to thermometers of this kind intended for measuring the temperatures in bore holes and its object is to provide improvements in the form and manufacture of such thermometers.

It is known that thermometers used for measuring the temperature variations inside bore holes should have the following properties:

(a) They should permit the measurement and if required, the recording of temperatures at distances frequently exceeding 2000 m. and even 3000 m., corresponding to the depths of bore holes. This involves an electrical problem which can be solved particularly by means of the arrangements described in my co-pending application Serial No. 181,879, filed Dec. 27, 1937 for "Improvements in Arrangements for measuring temperatures at a distance, particularly in bore holes." The arrangements there described make use of the resistance variations of certain substances which can be measured by means of a Wheatstone bridge.

(b) Such thermometers should be capable of taking the temperature in a very short time, so as to be able to follow the temperature variations of the media they traverse when they are moved inside the bore hole at a speed which may reach for instance 20 cm. per second.

(c) They should be suitable for movement through the salt water of the bore hole without detriment and without losing their properties, in other words they should withstand the action of this salt water and the pressure it exerts.

The improvements forming the subject matter of the present invention envisage the practical construction of thermometers complying with the various conditions enumerated. With these objects in view such a thermometer should firstly be provided with sufficient electrical insulation and should maintain this insulation during the course of measurements effected in the bore holes, where the thermometric element is brought into contact with hot salt water having conductive properties. Secondly it should permit rapid heat exchange between the surrounding medium and the thermometric element. This element should moreover be of low heat capacity so as to assume the ambient temperature rapidly without modifying that temperature by its presence. Thirdly it should be suitably protected externally from abrasion.

The present invention provides means for complying with these various conditions. For this purpose the invention consists essentially in covering the thermometric elements, which are made up of electrically insulated resistances having a resistivity variable with temperature, with a water tight sheath of good heat conducting properties serving to protect them against both moisture and abrasion.

The thermometric resistances may be formed in the known manner by a winding of some suitable metal having a high temperature coefficient and covered with any suitable insulating material. The sheath is preferably so arranged as almost completely to encase the winding in order that the transmission of heat may be as regular and rapid as possible. This result can be secured in practice according to the invention by encasing the winding in a mass of some plastic metal such as lead and then covering the whole with a thin protective sleeve of some malleable metal which nevertheless has a greater mechanical strength, such as copper.

To manufacture such a thermometer it is possible to proceed in accordance with the invention by compressing the heat conducting substance on to the winding, and this operation may be carried out cold. A practical method of putting the operation into effect will now be described.

A mandrel of metal is preferably covered with a heat insulating sheath, e. g. of ebonite, and upon this are simultaneously wound a lead wire and wires of some metal changing its resistance with temperature, the latter wires being covered with a thin insulating coating. A copper sleeve is then placed on the assembly and is compressed at a pressure which may be as high as 400 kg. per cm.$^2$ on to the winding of ferro-nickel and lead wires on the mandrel. The pressure so exerted crushes the lead wires and causes them to "flow" and fill up all the space between the copper tube and the mandrel not occupied by the ferro-nickel wires.

In another way of carrying out the method according to the invention the insulated wires constituting the thermometric resistance or resistances may likewise be covered by a metallic sheath, for instance of lead, and the wires so coated are then themselves used as a thermometric element placed in immediate contact with the water of the bore hole.

It is also possible to wind the wires thus sheathed in metal on to a mandrel and to compress on to them a copper sleeve, for example, as in the previous case.

Other characteristics of the invention will appear from the following description taken in conjunction with the accompanying drawings, which show diagrammatically by way of non-limiting examples several particular embodiments of the invention. In the drawings:

Figure 1 is a very diagrammatic section through a thermometer in accordance with the invention in which the measurement of resistance variations of the thermometric element, constituted by a winding of ferro-nickel, is carried out by means of a Wheatstone bridge, the winding in question forming for instance two opposite arms of this bridge as described particularly in my above mentioned copending application.

Figure 2:
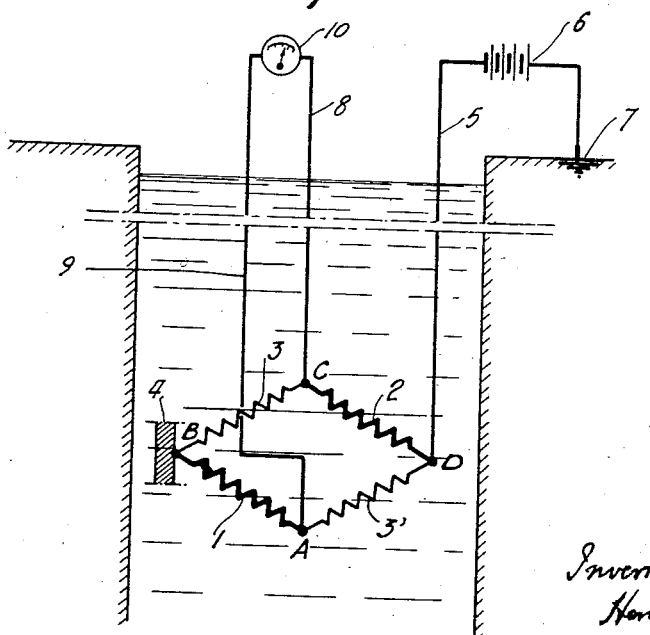

Figure 2 is a diagram of the electrical connections of the apparatus shown in Figure 1.

Figure 3:
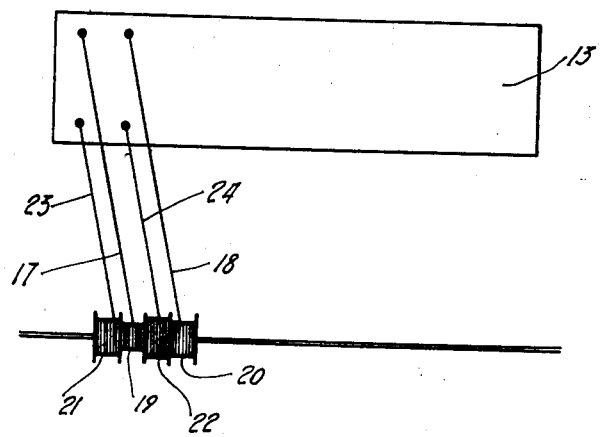
Figure 4:
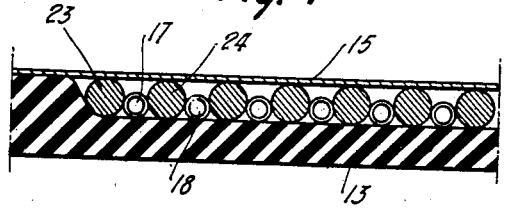
Figure 5:
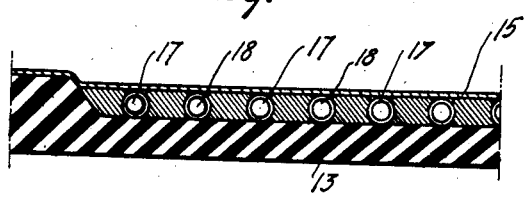

Figures 3, 4 and 5 are detailed views relating to one method of manufacture of the thermometric element, consisting in winding together with the lead wires, wires of a metal (such as ferro-nickel) having a high temperature coefficient: Figure 3 shows diagrammatically a method of winding simultaneously the insulated ferro-nickel wires and the lead wires, and Figures 4 and 5 are sectional views on a larger scale of the thermometric element showing the appearance of this element before and after compression.

Figure 6:
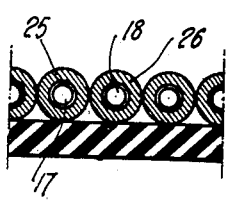
Figure 7:
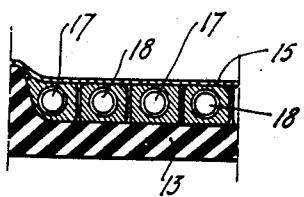

Figures 6 and 7 are similar detailed views relating to two other methods of carrying out the process according to the invention: Figure 6 is a section on an enlarged scale of a portion of a thermometric element made up simply of a wire of a metal having a high temperature coefficient covered with its insulating material and encased in a sheath of lead and Figure 7 is a corresponding view in section of another method of construction utilising a lead sheathed wire of the same kind as in the previous case, in which, however, the winding constituted by the wire is compressed in a copper sleeve as in the case of Figure 5.

The thermometer shown in Figure 1 is assumed here to have its electrical connections arranged in accordance with the diagram of Figure 2, which has already been particularly described in my above mentioned co-pending application. It is of course understood that this diagram is given here only by way of example and that any other electrical assembly of the thermometric element or elements could be utilised, since the invention is applicable to any thermometer operating by resistance variation whatever may be the manner in which the resistance variations of the thermometric element or elements are measured in practice.

1 and 2 are two thermometric elements of a suitable ferro-nickel alloy, such as fixampere. These two thermometric elements constitute two opposite resistance arms of a Wheatstone bridge. They are connected one to the corners A and B and the other to the corners C and D of this bridge.

The two other resistances B—C and A—D of the bridge in question, which are denoted in the drawings by 3 and 3', are made on the contrary of an alloy of which the resistance is not affected by temperature variations, such as constantan or manganin.

The corner B of the bridge is connected to the body 4 of the apparatus intended to be lowered into the bore hole with the whole Wheatstone bridge. The corner D on the other hand is connected by an insulated conductor 5 to a source of current 6, which is located at the surface of the ground and has its other terminal earthed at 7, for instance by being connected to the bore hole casing.

The other corners A and C of the Wheatstone bridge are connected by other insulated conductors 8 and 9 to a measuring instrument 10 located at the surface of the ground and intended to measure the potential differences between A and C.

The fixed resistances 3 and 3' are equal to each other and shall have a value R. The resistances of the thermometric elements are likewise equal to each other but of course variable with temperature. Their resistance has the value R at a given value To of the temperature.

If the intensity of the current passed through the diagonal B—D of the Wheatstone bridge by the source of current 6 is known and kept constant by any suitable method, the potential difference measured by the instrument 10 will depend solely on the temperature T of the medium in which the thermometric elements 1 and 2 are immersed together, and from this difference the temperature in question can be determined.

A detailed description will now be given with reference to Figure 1 of a constructional form of a thermometer primarily intended to operate on the principle just described.

11 in Figure 1 denotes a tubular steel mandrel closed at one of its ends 12. Upon this mandrel is fixed a sheath 13 of heat insulating material such for instance as ebonite.

This sheath 13 has the thermometric resistances 1 and 3 wound upon it side by side in a manner which will be explained subsequently. These thermometric resistances are suitably insulated electrically and as may be seen are completely encased in a mass of lead 14. The assembly is compressed in a copper sheath 15.

Two of the adjacent ends of these windings 1 and 2 pass through holes made in the mandrel 11 and the sheath 13 to terminate at the points of connection A and D.

The other ends of these thermometric resistances terminate in the same manner at the points of connection B and C. The points of connection A, B, C and D constitute the corners of the Wheatstone bridge described above with reference to Figure 2.

Inside the mandrel 11 are arranged in addition the spools 3 and 3' upon which the two fixed resistances A—D and B—C of the Wheatstone bridge are wound.

At its upper end the mandrel 11 is closed by a plug 16 which ensures absolute tightness of the interior of the mandrel. The connecting points A, C and D are connected to insulated conductors 9, 8 and 5 respectively, which pass through the plug 16 by means of any known device maintaining tightness of the latter.

A description will now be given with reference to Figures 3, 4 and 5 of a method of manufacture of the thermometric element having the form indicated above.

Figure 3 shows a possible method of procedure in winding the thermometric elements upon the mandrel, or better upon the ebonite sheath 13 carried by this mandrel.

The two wires of fixampere 17 and 18—which are coated with a thin layer of insulating material (such as an enamel coating or a silk or cotton twisting or covering) and provided for constituting later on the thermometric resistances 1 and 2—are carried by spools 19 and 20, while two other spools 21 and 22 carry lead wires 23 and 24, preferably of substantially larger diameter. The starting ends of the wires 17, 18 and 23, 24 are arranged on the mandrel as shown in Figure 3. By making the mandrel rotate these four wires are wound up at the same time as may be seen from the figure, the two wires of fixampere being separated by the two lead wires.

When the winding is finished and the copper sheath 15 has been put into place the assembly appears in section as shown on a larger scale in Figure 4.

By compressing the copper sheath 15 under a pressure for instance of 400 kg. per cm.² the lead wires are crushed and the metal flows so as almost completely to encase the fixampere wires as is shown in Figure 5. The assembly is made tight at the ends of the windings in any suitable manner. It is easy to conceive that such an arrangement permits rapid temperature exchanges between the surrounding medium and the thermometric wires 17 and 18. Moreover, the fact that the assembly constituted by the thermometric wires and the mass of lead encasing them is not arranged direct on the steel mandrel, but on an ebonite sheath, has the effect of considerably reducing the heat capacity of the device. Since the ebonite sheath forms a screen, this heat capacity is practically reduced to that of the thermometric wires with their lead sheathing. The remainder of the circuit may then without inconvenience maintain a temperature slightly different from that of the surrounding medium, since this other part of the circuit is not affected by temperature fluctuations.

In Figure 6, which shows another embodiment of the invention, the wires 17 and 18 covered with an insulating material are individually encased in the lead sheaths 25 and 26, (this encasing being effected in a known manner by means of a draw plate) and the wires so sheathed can then be used as they are as a thermometric element. Figure 6 shows the finished form in this case.

It may, however, be advantageous to protect the wires by a sleeve, for instance of copper, which is then compressed as in the case of Figure 5. The operation is carried out in exactly the same way, the lead sheath is crushed and "flows," and finally a thermometric element of the form shown in Figure 7 is obtained. Apart from the method of manufacture this form is entirely equivalent to that shown in Figure 5.

Many modifications can of course be applied to the arrangement described, as also to its method of manufacture defined above without passing outside the scope of the invention.

The term "fixampere" as employed in the preceding specification is employed to designate a certain ferronickel alloy whose temperature coefficient of resistance is very close to 1/250. The temperature coefficient of resistance is the constant $\alpha$ in the formula:

$$R_t = R_0 (1 + \alpha t)$$

in which:

$R_t$ represents the electric resistance of a metallic wire at the temperature $t$;

$R_0$ represents the electric resistance of the same metallic wire at the temperature 0.

What I claim is:

1. In a thermometer comprising a core, at least one resistance winding on the core constituting a thermometric element and made of a material of which the electrical resistance varies due to temperature changes, a covering of small thickness electrically insulating the wire of the resistance winding, a sheath of plastic metal encasing the individual turns of the winding and a thin sleeve of malleable metal stronger mechanically than the metal of the sheath tightly fitted on the sheathed winding so as to protect the insulating covering without detriment to the thermal conductivity between the thermometric element itself and the surrounding medium.

2. In a thermometer comprising at least one thermometric element of which the electrical resistance varies due to temperature changes, a heat insulating core for the thermometric element, a covering of small thickness to insulate the thermometric element electrically, a water tight plastic metal sheath of good heat conducting properties covering and in contact with the insulating covering on the thermometric element and so arranged as to protect the insulating covering without detriment to the thermal conductivity between the thermometric element itself and the surrounding medium, and a thin sleeve of malleable metal of greater mechanical strength than the metal of the sheath tightly fitted on the sheathed winding.

3. In a thermometer comprising two thermometric elements of which the electrical resistance varies due to temperature changes and two fixed resistances electrically connected to the ends of the thermometric elements to form with them a Wheatstone bridge, a core for said elements, a covering of small thickness to insulate the two thermometric elements electrically, a water tight plastic metal sheath of good heat conducting properties in contact with the insulating covering and covering the thermometric elements and so arranged as to protect their insulating covering without detriment to the thermal conductivity between the thermometric elements and the surrounding medium, and a thin sleeve of malleable metal of greater mechanical strength than the metal of the sheath tightly fitted on the sheathed elements.

4. In a thermometer comprising a heat insulating support, two resistance windings constituting thermometric elements juxtaposed on the heat insulating support and made of a material of which the electrical resistance varies due to temperature changes, and two invariable resistances electrically connected to the ends of the said windings to form with them a Wheatstone bridge, a covering of small thickness to insulate electrically the wire of the resistance windings, a water tight plastic metal sheath of good heat conducting properties in contact with the insulating covering and encasing the said windings and so arranged as to protect their insulating covering without detriment to the thermal conductivity between the thermometric elements and the surrounding medium, and a thin sleeve of malleable metal of greater mechanical strength than the metal of the sheath tightly fitted on the sheathed windings.

5. In a method of manufacture of thermometers comprising a support, at least one resistance winding constituting a thermometeric element and carried by the support, a covering of small thickness electrically insulating the wire of the said winding and a sheath of plastic metal practically encasing the winding, the operations of winding on to the support simultaneously the wire constituting the winding previously provided with its insulating covering and a wire of plastic metal, placing on the assembly a sleeve of malleable metal stronger mechanically than the said plastic metal, and then compressing the sleeve on to the wires wound on the support to deform the wire of plastic metal into the spaces between the winding and the sleeve whereby good thermal conductivity may be obtained.

6. In a method of manufacture of thermometers comprising a support, at least one resistance winding constituting a thermometric element and carried by the support, a covering of small thickness electrically insulating the wire of the said winding and a sheath of plastic metal encasing the individual wires the operations of winding on to the support the wire provided with its plastic metal sheath, placing on the wire so wound a sleeve of malleable metal stronger mechanically than the said plastic metal and then compressing the sleeve on to the sheathed wire winding to deform the wire of plastic metal into the spaces between the winding and the sleeve whereby good thermal conductivity may be obtained.

HENRI GEORGES DOLL.